(12) United States Patent
Ishida et al.

(10) Patent No.: US 11,364,890 B2
(45) Date of Patent: Jun. 21, 2022

(54) BRAKING DEVICE FOR VEHICLE

(71) Applicant: ADVICS CO., LTD., Kariya (JP)

(72) Inventors: Yasuhito Ishida, Toyokawa (JP);
Tatsushi Kobayashi, Kariya (JP);
Takayuki Yamamoto, Nagakute (JP)

(73) Assignee: ADVICS CO., LTD., Kariya (JP)

( * ) Notice: Subject to any disclaimer, the term of this patent is extended or adjusted under 35 U.S.C. 154(b) by 120 days.

(21) Appl. No.: 16/086,891

(22) PCT Filed: Mar. 28, 2017

(86) PCT No.: PCT/JP2017/012733
§ 371 (c)(1),
(2) Date: Sep. 20, 2018

(87) PCT Pub. No.: WO2017/170596
PCT Pub. Date: Oct. 5, 2017

(65) Prior Publication Data
US 2019/0100184 A1  Apr. 4, 2019

(30) Foreign Application Priority Data

Mar. 30, 2016 (JP) .............................. JP2016-067325
Jun. 27, 2016 (JP) .............................. JP2016-126462

(51) Int. Cl.
*B60T 13/68* (2006.01)
*B60T 7/04* (2006.01)
(Continued)

(52) U.S. Cl.
CPC ............ *B60T 13/686* (2013.01); *B60T 7/042* (2013.01); *B60T 8/40* (2013.01); *B60W 10/188* (2013.01);
(Continued)

(58) Field of Classification Search
CPC .......... B60T 13/686; B60T 7/042; B60T 8/40; B60T 13/662; B60W 10/188; B60W 10/192
See application file for complete search history.

(56) References Cited

U.S. PATENT DOCUMENTS 6,899,403 B2 * 5/2005 Isono .................... B60T 8/4018
303/11
7,234,786 B2 * 6/2007 Mori ..................... B60T 8/4872
303/11
(Continued)

FOREIGN PATENT DOCUMENTS

| JP | 2001026263 A | 1/2001 |
| JP | 2013071714 A | 4/2013 |
| JP | 2015136993 A | 7/2015 |

OTHER PUBLICATIONS

International Search Report (with English Translation) and Written Opinion issued in International Patent Application No. PCT/JP2017/012733, (7 pages) (dated Jul. 4, 2017).

*Primary Examiner* — Xuan Lan Nguyen
(74) *Attorney, Agent, or Firm* — Buchanan Ingersoll & Rooney PC

(57) ABSTRACT

A braking device includes: a reservoir; a master cylinder in which when the amount of operation performed on a brake pedal reaches or exceeds a predetermined amount, a port communicating between a pressure chamber and the reservoir is cut off and hydraulic pressure corresponding to the brake pedal operation amount is generated; a hydraulic pressure unit for adjusting the wheel cylinder hydraulic pressure; and a control unit for controlling the hydraulic pressure unit. The control unit determines, based on a temperature-related value related to the temperature of a friction member pressed by the wheel cylinder hydraulic pressure against a rotating member fixed to a wheel, whether (Continued)

the friction member is in a fade state. When the friction member is in a fade state, the control unit controls the hydraulic pressure unit to suction brake fluid from the reservoir through the port, and is fed to the wheel cylinder.

11 Claims, 7 Drawing Sheets

(51) Int. Cl.
    *B60T 8/40*     (2006.01)
    *B60W 10/192*     (2012.01)
    *B60W 10/188*     (2012.01)
    *B60T 8/17*     (2006.01)
    *B60T 13/66*     (2006.01)

(52) U.S. Cl.
    CPC .............. *B60W 10/192* (2013.01); *B60T 8/17* (2013.01); *B60T 13/662* (2013.01)

(56) References Cited

U.S. PATENT DOCUMENTS

| | | | |
|---|---|---|---|
| 8,434,830 B2* | 5/2013 | Niino | B60T 13/686 |
| | | | 303/113.4 |
| 2015/0151729 A1* | 6/2015 | Yamasoe | B60T 7/042 |
| | | | 303/122.03 |

* cited by examiner

BRAKING DEVICE FOR VEHICLE

TECHNICAL FIELD

The present invention relates to a braking device for a vehicle.

BACKGROUND ART

A phenomenon called a fade in which a friction coefficient (an effect of brake) gradually lowers as the temperature of a friction surface becomes higher at the time of braking is conventionally known. When a wheel cylinder hydraulic pressure is increased by a hydraulic pressure unit to suppress the lowering of deceleration by the fade, when a piston of a master cylinder is bottomed (bottoming), the wheel cylinder hydraulic pressure cannot be increased any further. The enlargement of the master cylinder is necessary to prevent bottoming even at the time of fade.

With regards to this, Patent Literature 1 describes arranging a check valve that permits the flow of the brake fluid from a reservoir to a pressure chamber of the master cylinder. Whether or not being in the fade state is determined based on the master cylinder hydraulic pressure and the deceleration of the vehicle when the brake operation is carried out. When determined as being in the fade state, the hydraulic pressure unit suctions the brake fluid of the reservoir through the check valve, and supplies the brake fluid to the wheel cylinder. Thus, the enlargement of the master cylinder and the lowering of the deceleration by the fade can be suppressed.

However, the configuration described in Patent Literature 1 cannot avoid increase in the number of components, rise in cost, and increase in weight due to the addition of the check valve. Furthermore, since the determination of the fade state is made based on the master cylinder hydraulic pressure and the deceleration of the vehicle at the time of the brake operation, the deceleration may temporarily become insufficient.

CITATIONS LIST

Patent Literature

Patent Literature 1: Japanese Unexamined Patent Application Publication No. 2013-71714

SUMMARY OF INVENTION

In order to overcome such a problem, the present invention aims to provide a braking device for a vehicle that enhances a pressurization performance at the time of the fade without enlarging the master cylinder.

A braking device for a vehicle according to the present invention includes: a reservoir (RS) that stores brake fluid; a master cylinder (MC) that generates a hydraulic pressure corresponding to an operation amount of a brake pedal (BP) when the operation amount of the brake pedal (BP) becomes greater than or equal to a predetermined amount and when a port (12a, 12b) communicating a pressure chamber (13a, 13b) and the reservoir (RS) is cut off; a hydraulic pressure unit (HU) arranged between the master cylinder (MC) and a wheel cylinder (Wfr, Wfl, Wrr, Wrl) to adjust a hydraulic pressure of the wheel cylinder (Wfr, Wfl, Wrr, Wrl); and an electronic control unit (ECU) that controls the hydraulic pressure unit (HU). The features of the braking device for the vehicle according to the present invention lie in that the electronic control unit (ECU) is configured to determine whether or not a friction member is in a fade state, based on a temperature-related value related to a temperature of the friction member pushed by the hydraulic pressure of the wheel cylinder (Wfr, Wfl, Wrr, Wrl) against a rotating member fixed to a wheel (FR, FL, RR, RL), and when determining that the friction member is in the fade state, the electronic control unit is configured to control the hydraulic pressure unit (HU) to execute a pre-charge of suctioning the brake fluid from the reservoir (RS) through the port (12a, 12b) during a period in which the port (12a, 12b) is communicating the pressure chamber (13a, 13b) and the reservoir (RS) and of supplying the fluid to the wheel cylinder (Wfr, Wfl, Wrr, Wrl).

The electronic control unit (ECU) may be configured to compute a target value of the hydraulic pressure of the wheel cylinder (Wfr, Wfl, Wrr, Wrl) at a time of executing the pre-charge, based on the temperature-related value.

According to the features of the present invention, the brake fluid is suctioned from the reservoir before the driver operates the brake pedal by an amount greater than or equal to a predetermined amount in the fade state, so that the consumption of the brake fluid in the pressure chamber of the master cylinder can be reduced. Thus, the enlargement of the master cylinder can be suppressed. The fade state is determined based on the temperature-related value related to the temperature of the friction member, and the brake fluid is supplied to the wheel cylinder in advance to avoid the deceleration from actually becoming insufficient. Furthermore, the required hydraulic pressure of the wheel cylinder changes according to the extent of the fade state. The pressurization responsiveness at the time of fade can be enhanced in accordance with the extent of the fade state by the configuration of computing the target value of the hydraulic pressure of the wheel cylinder at the time of executing the pre-charge, based on the temperature-related value.

Furthermore, the electronic control unit (ECU) may be configured to adjust the target value to a larger value as a reduction speed of an accelerator pedal operation amount is greater or as an increase speed of a brake pedal operation amount is greater.

The greater the reduction speed of the accelerator pedal operation amount, the higher the probability that a sudden braking operation is to be subsequently carried out. The greater the increase speed of the brake pedal operation amount, the more brake fluid is to be supplied to the wheel cylinder by the pre-charge. Thus, according to the configuration of increasing the target value of the hydraulic pressure of the wheel cylinder by the pre-charge as a reduction speed of the accelerator pedal operation amount is greater or as the increase speed of the brake pedal operation amount is greater, the brake fluid in the reservoir can be reliably and sufficiently supplied to the wheel cylinder before the brake pedal operation amount becomes greater than or equal to a predetermined amount, and furthermore, the pressurization responsiveness at the time of fade can be further enhanced.

The electronic control unit (ECU) may be configured to start to gradually reduce the target value according to an operation mode of a driver of the vehicle at a time of executing the pre-charge, and terminate executing the pre-charge when the target value becomes zero.

The pre-charge supplies the brake fluid to the wheel cylinder in advance before the driver operates the brake pedal by an amount greater than or equal to the predetermined amount, and thus it is desirable to terminate the pre-charge when the determination can be made that further pre-charge is not necessary from the operation mode of the driver. The continuation of unnecessary pre-charge can be avoided by the configuration of starting the gradual reduction of the target value of the hydraulic pressure of the wheel cylinder by the pre-charge according to the operation mode of the driver, and terminating the pre-charge when the target value becomes zero.

When the vehicle includes two systems of brake hydraulic pressure circuits for the front and rear, the electronic control unit (ECU) may control the hydraulic pressure unit (HU) to execute the pre-charge only on either one of the front wheel (FR, FL) system and the rear wheel (RR, RL) system.

The pressure intensifying responsiveness can be enhanced by executing the pressurization by the pre-charge on only one of the two systems of hydraulic pressure circuits. Generally, the fluid consumption of the wheel cylinder of the rear wheels is smaller than that of the front wheels, and thus the master cylinder can be reduced by configuring the master cylinder so that the fluid amount of the rear wheel system can be covered and compensating the deficient fluid amount with the front wheel system of a greater fluid consumption through the pre-charge. Furthermore, generally, the deceleration of the vehicle is less likely to occur in the brake of the rear wheels, and thus natural brake feeling can be obtained by executing the pre-charge only on the rear wheel system side.

DESCRIPTION OF EMBODIMENTS

Hereinafter, an embodiment of the present invention will be described with reference to the drawings.

Figure 1:
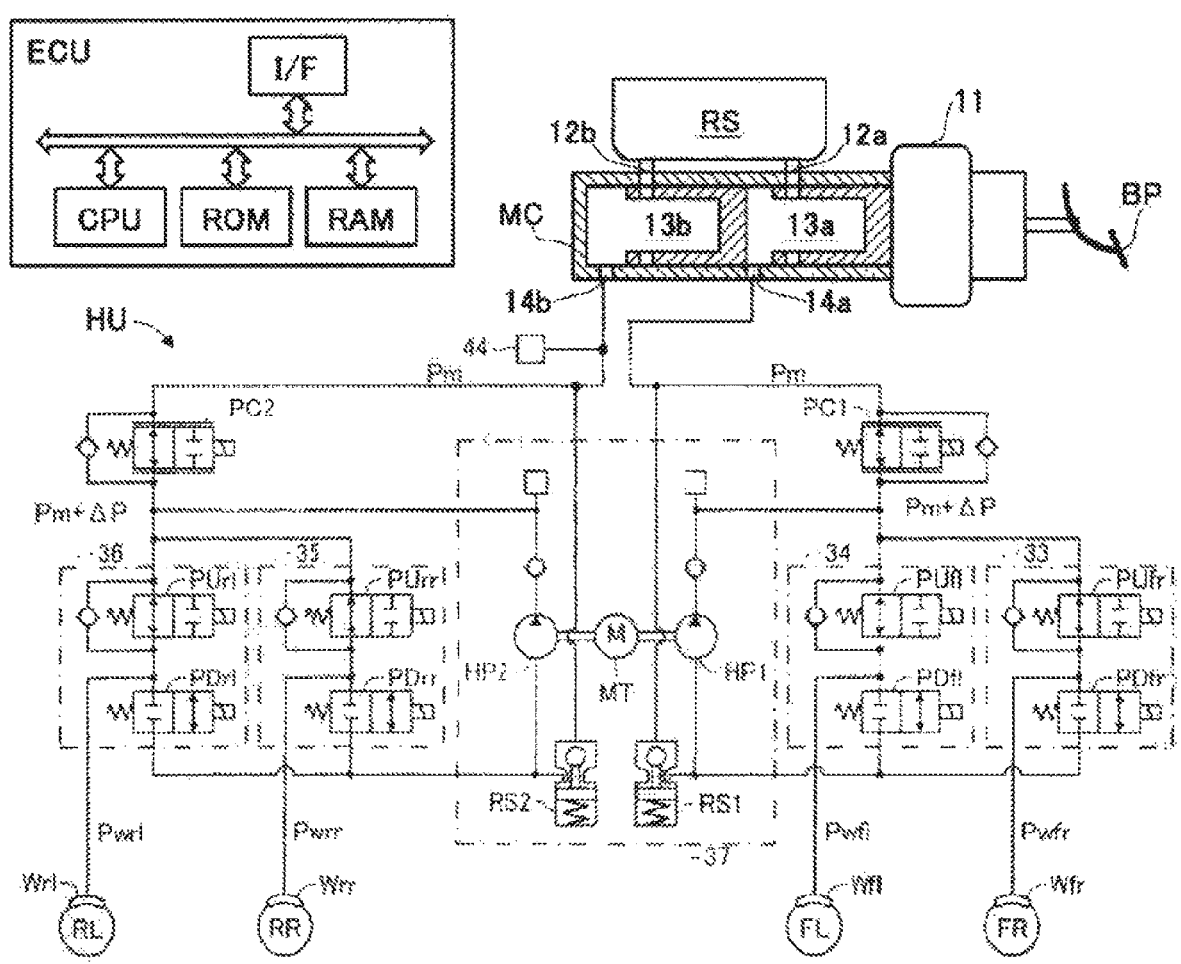
FIG. 1 is a schematic configuration of a braking device for a vehicle according to an embodiment of the present invention.

FIG. 1 shows a schematic configuration of a braking device for a vehicle according to an embodiment of the present invention. Hereinafter, "**" denoted at the foot of various types of variables, and the like is a comprehensive notation of "fr", "fl", and the like denoted at the foot of various types of variables and the like to indicate to which one of the wheels FR, FL, RR, RL the various types of variables, and the like are related.

The braking device for the vehicle generates a friction braking force by the wheel cylinder hydraulic pressure at a wheel . As shown in FIG. 1, the braking device of the present embodiment is configured including a booster 11 that amplifies an operation force of a brake pedal BP, a master cylinder MC that generates a hydraulic pressure corresponding to an operation amount (the stroke or pressing force) of the brake pedal BP, a reservoir RS that stores the brake fluid, a hydraulic pressure unit HU that can adjust a wheel cylinder hydraulic pressure to supply to a wheel cylinder W arranged at the wheel , and an electronic control unit ECU that controls the hydraulic pressure unit HU. At the wheel , the friction member (e.g., a brake pad) is pressed against a rotating member (e.g., a brake disc) that integrally rotates with the wheel with a pressing force corresponding to the wheel cylinder hydraulic pressure of the W**, so that the friction braking force corresponding to the wheel cylinder hydraulic pressure is applied.

The booster 11 can adopt, for example, a negative pressure booster, a hydraulic pressure booster, an electric booster, and the like. The master cylinder MC of the present embodiment is a tandem type master cylinder including two pressure chambers 13a, 13b partitioned by two pistons arranged in series in a cylinder main body. When the brake pedal BP is not operated and each piston is at an initial position, the reservoir RS and the pressure chambers 13a, 13b are communicated by way of communication ports 12a, 12b. When the brake pedal BP is operated and each piston is moved forward to a position where the communication ports 12a, 12b are cut off, the hydraulic pressure (the master cylinder hydraulic pressure Pm) corresponding to the operation amount of the brake pedal BP is generated in the pressure chambers 13a, 13b. The master cylinder MC outputs the master cylinder hydraulic pressure Pm from two output ports 14a, 14b.

The hydraulic pressure unit HU is configured to include linear electromagnetic valves PC1, PC2, brake hydraulic pressure adjusting units 33 to 36, and a reflux brake fluid supplying unit 37. A constantly opened linear electromagnetic valve PC1 is interposed between one output port 14a of the master cylinder MC and an upstream portion of the brake hydraulic pressure adjusting unit 33, 34, and a constantly opened linear electromagnetic valve PC2 is interposed between the other output port 14b of the master cylinder MC and an upstream portion of the brake hydraulic pressure adjusting unit 35, 36. The details of the linear electromagnetic valves PC1, PC2 will be described later.

The brake hydraulic pressure adjusting units 33 to 36 are configured by a pressure increase valve PU that is a two port two position switching type constantly opened linear electromagnetic open/close valve, and a pressure decrease valve PD that is a two port two position switching type constantly closed electromagnetic open/close valve. The pressure increase valve PU can communicate/cut off the upstream portion of the corresponding adjusting unit of the brake hydraulic pressure adjusting units 33 to 36 and the wheel cylinder W. The pressure decrease valve PD can communicate/cut off the wheel cylinder W and the corresponding reservoir of the reservoirs RS1, RS2. As a result, the hydraulic pressure (the wheel cylinder hydraulic pressure Pw) of the wheel cylinder W can be increased, held, and decreased by controlling the pressure increase valve PU* and the pressure decrease valve PD**.

The reflux brake fluid supplying unit 37 includes a DC motor MT, and two hydraulic pressure pumps (gear pumps) HP1, HP2 simultaneously driven by the motor MT. The hydraulic pressure pumps HP1, HP2 pump up the brake fluid in the reservoirs RS1, RS2 refluxed from the pressure decrease valve PD**, and supply the pumped brake fluid to the upstream portion of the brake hydraulic pressure adjusting units 33 to 36. Furthermore, when the pressure chamber 13a, 13b of the master cylinder MC is communicating with the reservoir RS, the hydraulic pressure pumps HP1, HP2 suction the brake fluid in the reservoir RS through the communication ports 12a, 12b and supply the suctioned brake fluid to the upstream portion of the brake hydraulic pressure adjusting unit 33 to 36.

Next, the constantly opened linear electromagnetic valves PC1, PC2 will be described. On a valve body of the constantly opened linear electromagnetic valves PC1, PC2, a force in an opening direction based on the biasing force from the coil spring (not shown) is constantly acting, and a force in the opening direction based on a differential pressure (linear valve differential pressure $\Delta P$) obtained by subtracting the master cylinder hydraulic pressure Pm from the pressure at the upstream portion of the corresponding adjusting unit of the brake hydraulic pressure adjusting units 33 to 36 and a force in the closing direction based on a suction force that proportionally increases according to the current (command current Id) supplied to the constantly opened linear electromagnetic valves PC1, PC2 are acting.

As a result, the command differential pressure $\Delta Pd$, which is a command value of the linear valve differential pressure $\Delta P$, is determined to proportionally increase according to the command current Id. The constantly opened linear electromagnetic valves PC1, PC2 are closed when $\Delta Pd$ is greater than $\Delta P$, and are opened when $\Delta Pd$ is smaller than $\Delta P$. As a result, when the hydraulic pressure pumps HP1, HP2 are driven, the brake fluid at the upstream portion of the corresponding adjusting unit of the brake hydraulic pressure adjusting units 33 to 36 is flowed to the corresponding port side of the master cylinder MC through the corresponding electromagnetic valve of the constantly opened linear electromagnetic valves PC1, PC2 so that the linear valve differential pressure $\Delta P$ can be adjusted to match the command differential pressure $\Delta Pd$. The brake fluid that flowed into the corresponding port side of the master cylinder MC is refluxed to the corresponding reservoir of the reservoirs RS1, RS2.

In other words, when the motor MT (therefore, hydraulic pressure pumps HP1, HP2) is driven, the linear valve differential pressure $\Delta P$ is controlled according to the command current Id of the constantly opened linear electromagnetic valves PC1, PC2. The pressure at the upstream portion of the brake hydraulic pressure adjusting units 33 to 36 becomes a value (Pm+$\Delta P$) in which the linear valve differential pressure $\Delta P$ is added to the master cylinder hydraulic pressure Pm. After the drive of the hydraulic pressure pumps HP1, HP2 is stopped in a state where the linear valve differential pressure $\Delta P$ is adjusted to a value greater than zero, the command current Id is adjusted in a reducing direction so that the linear valve differential pressure $\Delta P$ can be continuously adjusted only in the reducing direction.

When the constantly opened linear electromagnetic valves PC1, PC2 are in a non-excited state (i.e., when the command current Id is set to "0"), PC1 and PC2 maintain the opened state by the biasing force of the coil spring. In this case, the linear valve differential pressure $\Delta P$ becomes "0", and the pressure at the upstream portion of the brake hydraulic pressure adjusting units 33 to 36 becomes equal to the master cylinder hydraulic pressure Pm. Furthermore, even when the constantly opened linear electromagnetic valves PC1, PC2 are in the non-excited state, the pressure at the upstream portion of the brake hydraulic pressure adjusting units 33 to 36 can be made slightly higher than the master cylinder hydraulic pressure Pm with the orifice of PC1, PC2 by driving the hydraulic pressure pumps HP1, HP2. When the master cylinder hydraulic pressure Pm higher than the pressure at the upstream portion of the brake hydraulic pressure adjusting units 33 to 36 is generated, the brake fluid flows into the upstream portion of the brake hydraulic pressure adjusting units 33 to 36 from the master cylinder MC by a one-direction valve connected in parallel with the constantly opened linear electromagnetic valves PC1, PC2.

According to the configuration described above, the braking device of the present embodiment is configured by the two systems of hydraulic pressure circuits one of which is a system related to the left and right front wheels FR, FL and the other of which is a system related to the left and right rear wheels RR, RL. In the braking device, the wheel cylinder hydraulic pressure Pw** adjusted to a value equal to the master cylinder hydraulic pressure Pm when all the electromagnetic valves are in the non-excited state.

When the motor MT (therefore, hydraulic pressure pumps HP1, HP2) is driven and the constantly opened linear electromagnetic valves PC1, PC2 are controlled in such a state, the wheel cylinder hydraulic pressure Pw is adjusted to the hydraulic pressure (Pm+$\Delta P$). Furthermore, the wheel cylinder hydraulic pressure Pw can be independently adjusted for every wheel by controlling the pressure increase valve PU and the pressure decrease valve PD. In other words, the braking force to be applied to the wheel ** can be independently adjusted for every wheel regardless of the operation of the brake pedal BP by the driver.

The electronic control unit ECU includes a CPU, a ROM, a RAM, an interface, and the like. The interface is connected to various sensors/switches including the master cylinder hydraulic pressure sensor 44 that detects the master cylinder hydraulic pressure Pm to provide a signal from the sensor/switch to the CPU and to send a drive signal to the electromagnetic valve (constantly opened linear electromagnetic valves PC1, PC2, the pressure increase valve PU and the pressure decrease valve PD) of the hydraulic pressure unit HU and the motor MT according to the instruction of the CPU. For example, the electronic control unit ECU of the present embodiment can receive signals from a wheel speed sensor that detects a rotation speed of a wheel, a brake switch that selectively outputs a signal corresponding to presence/absence of the operation of the brake pedal BP, a stroke sensor that detects a pedal stroke as an operation amount of the brake pedal BP, an accelerator opening sensor that detects an accelerator opening as an operation amount of an accelerator pedal (not shown), a front and rear acceleration sensor, a lateral acceleration sensor, a yaw rate sensor, and the like. The signal from the sensor/switch can be acquired through a communication bus from another device. The vehicle speed can be computed based a detection result of the wheel speed sensor.

Figure 2:
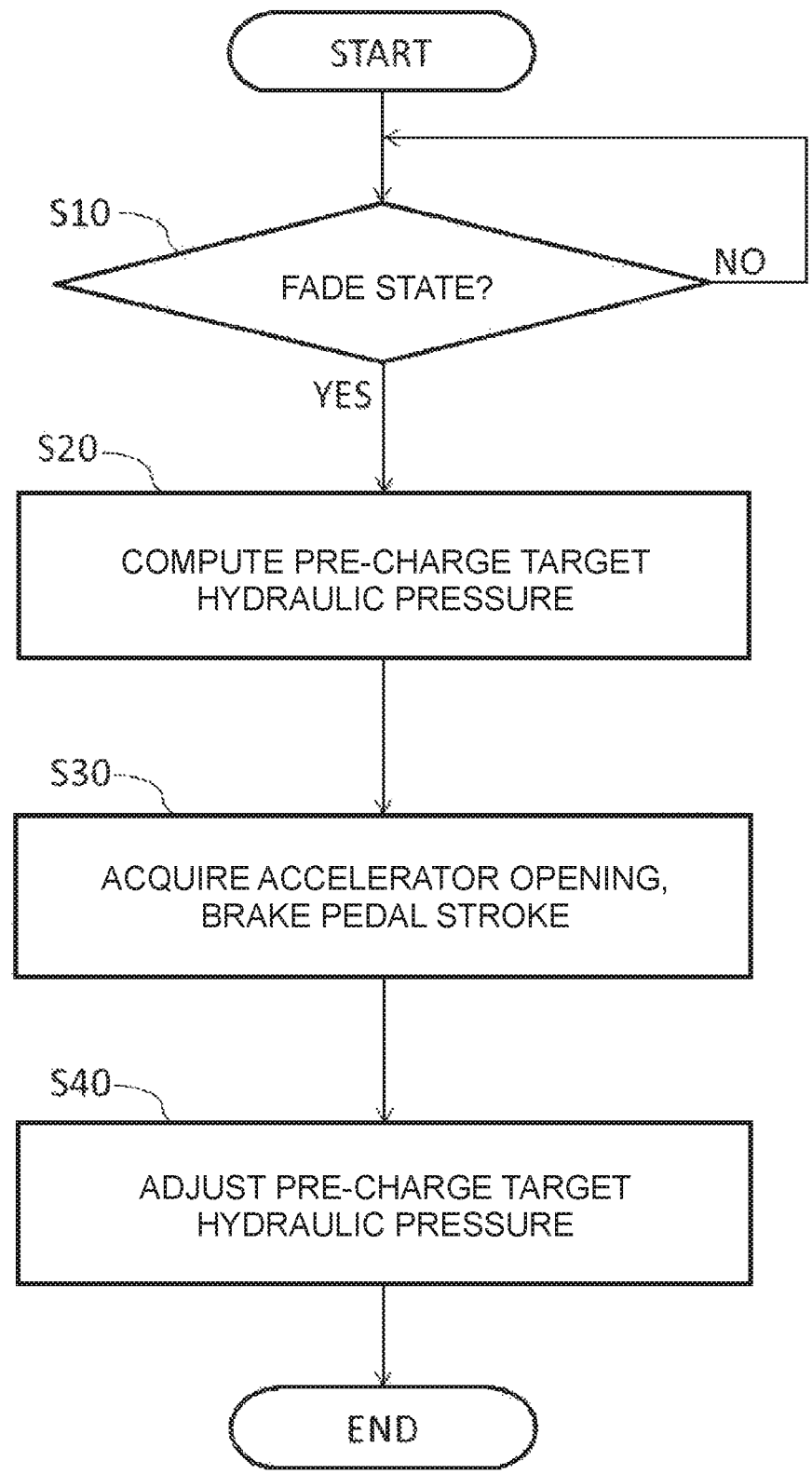
FIG. 2 is a flowchart of a control executed by an electronic control unit ECU shown in FIG. 1.

Next, the control executed by the electronic control unit ECU will be described with reference to the flowchart of FIG. 2. As shown in FIG. 2, the electronic control unit ECU determines whether or not a brake pad (the friction member of the present embodiment) is in the fade state in step S10, and returns to step S10 if not in the fade state (step S10: NO). In other words, the electronic control unit ECU waits at step S10 until determining that the brake pad is in the fade state. When determining that the brake pad is in the fade state (step S10: YES), the electronic control unit ECU computes a pre-charge target hydraulic pressure in step S20.

Figure 3:
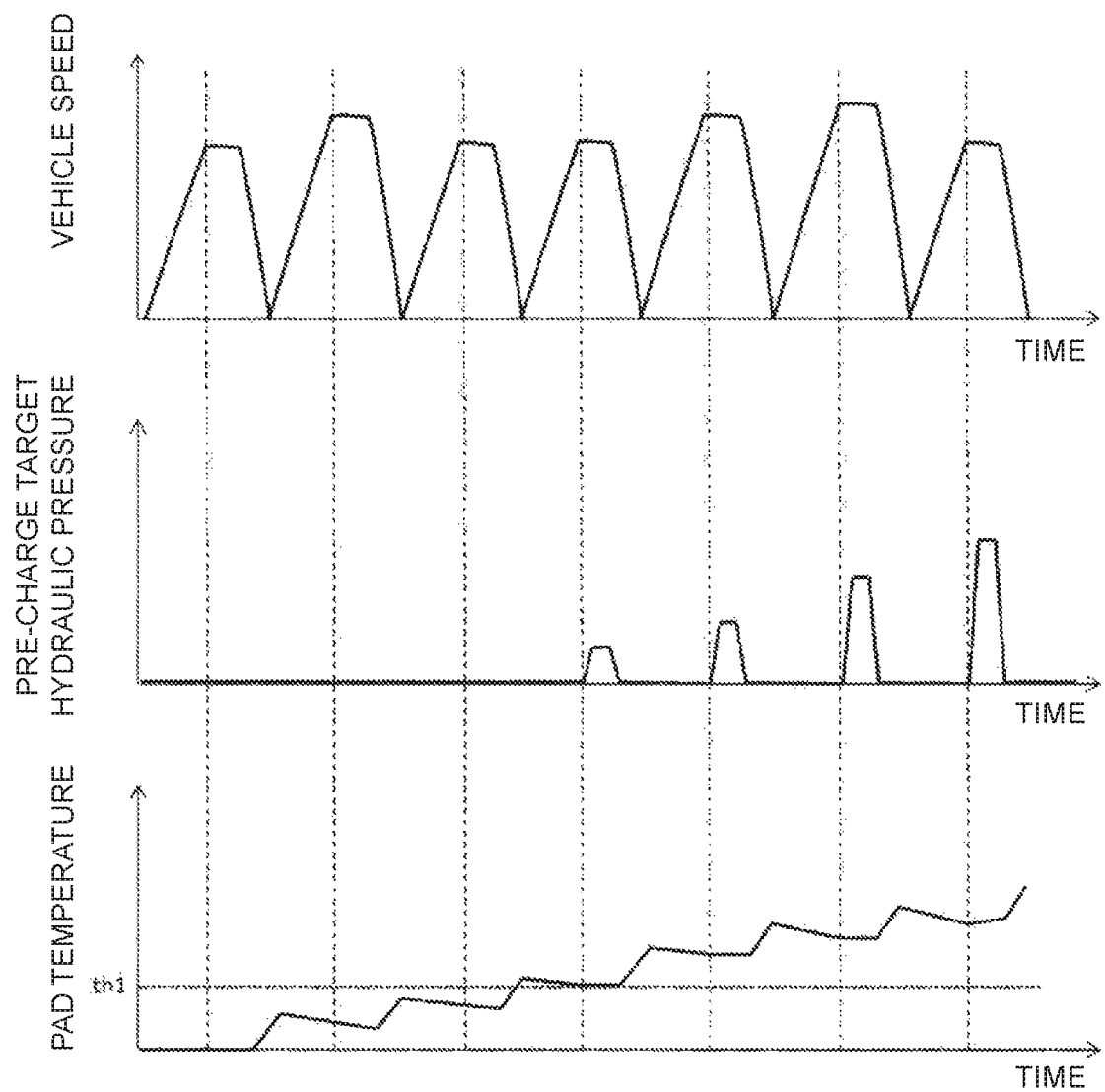
FIG. 3 is a time chart (I) describing the operation of the braking device for the vehicle according to the embodiment of the present invention.

The processes of step S10 and step S20 will be described in detail with reference to FIG. 3. FIG. 3 is a time chart describing the operation of the braking device for the vehicle according to the present embodiment. As shown in FIG. 3, when acceleration and deceleration are alternately carried out, the temperature (the pad temperature) of the brake pad gradually rises by the repeated braking. The electronic control unit ECU determines whether or not the brake pad is in the fade state, based on the pad temperature. Specifically, the determination is made that the brake pad is in the fade state, when the pad temperature becomes greater than or equal to a threshold value th1. The pad temperature can be acquired by a sensor for measuring the pad temperature. Furthermore, the pad temperature fluctuates according to the brake pedal operation time, the number of brake pedal operations, and the brake pedal operation amount, and the greater such values become, the higher the temperature becomes. Furthermore, the pad temperature fluctuates according to the vehicle speed (the kinetic energy), and the greater the kinetic energy converted to heat energy by the brake pedal operation becomes, the higher the temperature becomes. Therefore, the electronic control unit ECU can determine whether or not the brake pad is in the fade state, based on temperature-related values (or the pad temperature estimated value estimated therefrom) related to the pad temperature.

When determining that the brake pad is in the fade state, the electronic control unit ECU computes the pre-charge target hydraulic pressure according to the pad temperature (a measurement value or an estimated value). Specifically, as shown in FIG. 3, the electronic control unit ECU computes a larger pre-charge target hydraulic pressure as the difference of the pad temperature and the threshold value th1 is greater at a timing of transitioning from acceleration to deceleration. Furthermore, an upper limit value (e.g., 0.5 MPa) can be set for the pre-charge target hydraulic pressure.

Figure 4:
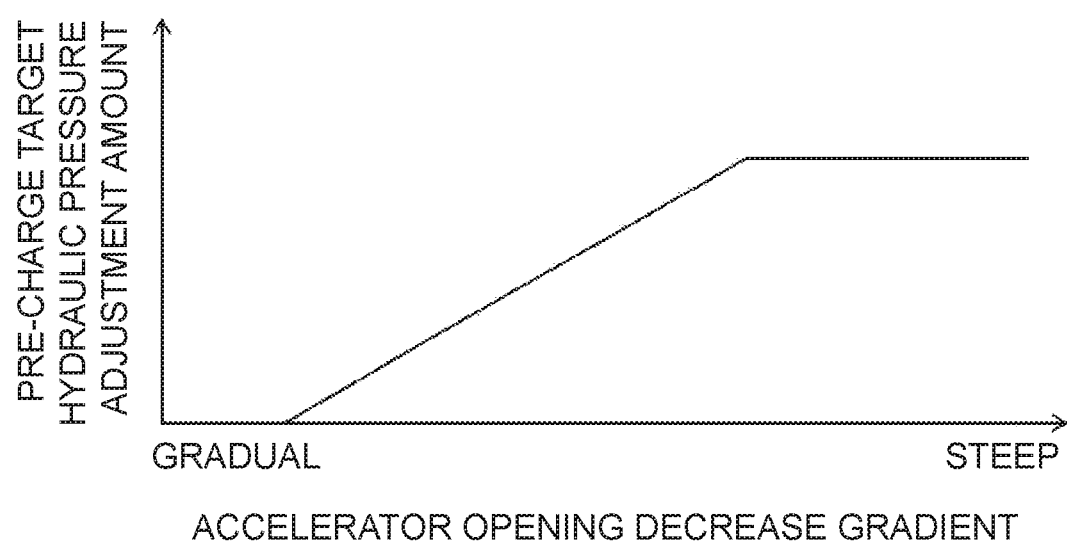
FIG. 4 is one example of a map associating a decrease gradient of an accelerator opening with an adjustment amount of a pre-charge target hydraulic pressure.

Referring again to FIG. 2, the electronic control unit ECU acquires the accelerator opening and the brake pedal stroke in step S30. The electronic control unit ECU adjusts the pre-charge target hydraulic pressure in step S40, based on the acquired accelerator opening and the brake pedal stroke. For example, the ROM is stored with a map associating the decrease gradient (the change speed in the pedal returning direction of the accelerator pedal operation amount) of the accelerator opening with the adjustment amount of the pre-charge target hydraulic pressure, as shown in FIG. 4. The adjustment amount of the pre-charge target hydraulic pressure is set so that when the decrease gradient of the accelerator opening becomes greater than a predetermined value, the steeper the decrease gradient according to the decrease gradient, the greater the adjustment amount becomes. An upper limit value (e.g., 0.5 MPa) can be set to the adjustment amount of the pre-charge target hydraulic pressure. The electronic control unit ECU adds the adjustment amount of step S40 to the pre-charge target hydraulic pressure computed in step S20 to set a final pre-charge target hydraulic pressure.

Figure 5:
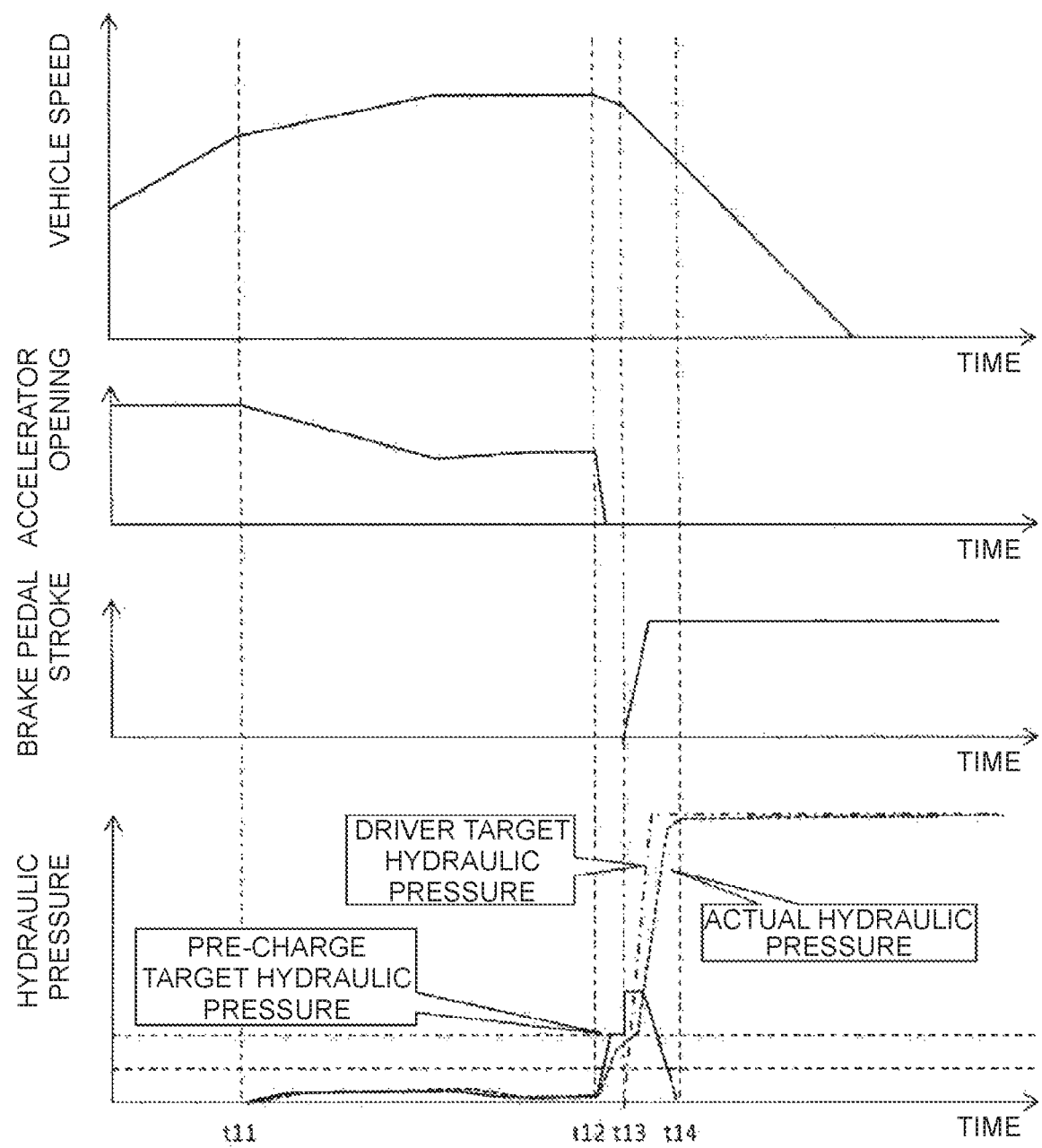
FIG. 5 is a time chart (II) describing the operation of the braking device for the vehicle according to the embodiment of the present invention.

Hereinafter, an operation when the brake pad is in the fade state will be specifically described with reference to the time charts of FIGS. 5 to 7. FIG. 5 shows an operation when a driver shifts from the accelerator pedal operation to the brake pedal operation. When the accelerator opening starts to reduce at time t11, the pre-charge target hydraulic pressure that is adjusted according to the decrease gradient of the accelerator opening is set (a solid line). When the motor MT and the linear electromagnetic valves PC1, PC2 of the hydraulic pressure unit HU are controlled by the electronic control unit ECU according to the pre-charge target hydraulic pressure, the actual value (the actual hydraulic pressure) of the wheel cylinder hydraulic pressure Pw** changes so as to follow the pre-charge target hydraulic pressure (a broken line). As the accelerator opening is held constant at a value larger than a predetermined value before time t11, the electronic control unit ECU determines that the driver has an intention of further accelerating the vehicle, and does not carry out the control corresponding to the pre-charge target hydraulic pressure.

When the accelerator opening is suddenly reduced at time t12, the pre-charge target hydraulic pressure is rapidly increased in accordance therewith, and the actual hydraulic pressure is also increased accompanying therewith. When the brake pedal stroke is raised at time t13, the electronic control unit ECU increases the volume of the pre-charge target hydraulic pressure by a predetermined amount in accordance therewith. The amount of increase in volume of the pre-charge target hydraulic pressure can be made greater as the increase speed of the brake pedal stroke is larger. At the same time, the electronic control unit ECU computes the hydraulic pressure (the driver target hydraulic pressure) corresponding to the braking force requested by the driver according to the brake pedal stroke (a chain dashed line). The actual hydraulic pressure changes so as to be equal to the larger one of the pre-charge target hydraulic pressure and the driver target hydraulic pressure.

When the actual hydraulic pressure becomes greater than the pre-charge target hydraulic pressure, the electronic control unit ECU determines that the pre-charge control is no longer necessary, and gradually reduces the pre-charge target hydraulic pressure. When the pre-charge target hydraulic pressure becomes zero at time t14, the electronic control unit ECU terminates the pre-charge control. Since the master cylinder hydraulic pressure Pm and the wheel cylinder hydraulic pressure Pw** can be assumed as substantially the same at the timing at which the actual hydraulic pressure becomes greater than the pre-charge target hydraulic pressure, the electronic control unit ECU can start the gradual reduction of the pre-charge target hydraulic pressure, based on the detection value of the master cylinder hydraulic pressure sensor 44.

Thus, according to the present embodiment, when in the fade state, the pre-charge target hydraulic pressure adjusted according to the decrease gradient of the accelerator opening is set before timing t13 at which the driver starts the operation of the brake pedal BP. Since the reservoir RS and the pressure chambers 13a, 13b communicates with each other when the brake pedal BP is not operated, the brake fluid can be suctioned from the reservoir RS, and the consumption of brake fluid in the pressure chamber of the master cylinder MC can reduced. Thus, the enlargement of the master cylinder can be suppressed. Furthermore, the volume of the pre-charge target hydraulic pressure is increased by a predetermined amount at timing t13 at which the operation of the brake pedal BP is started. The brake fluid can be suctioned from the reservoir RS even when the operation of the brake pedal BP is started until each piston is moved forward to a position where the communication ports 12a, 12b are cut off. Thus, in addition to obtaining the effects similar to the above, the responsiveness in an event the pressurization of the wheel cylinder hydraulic pressure Pw** is actually necessary can be enhanced.

Figure 6:
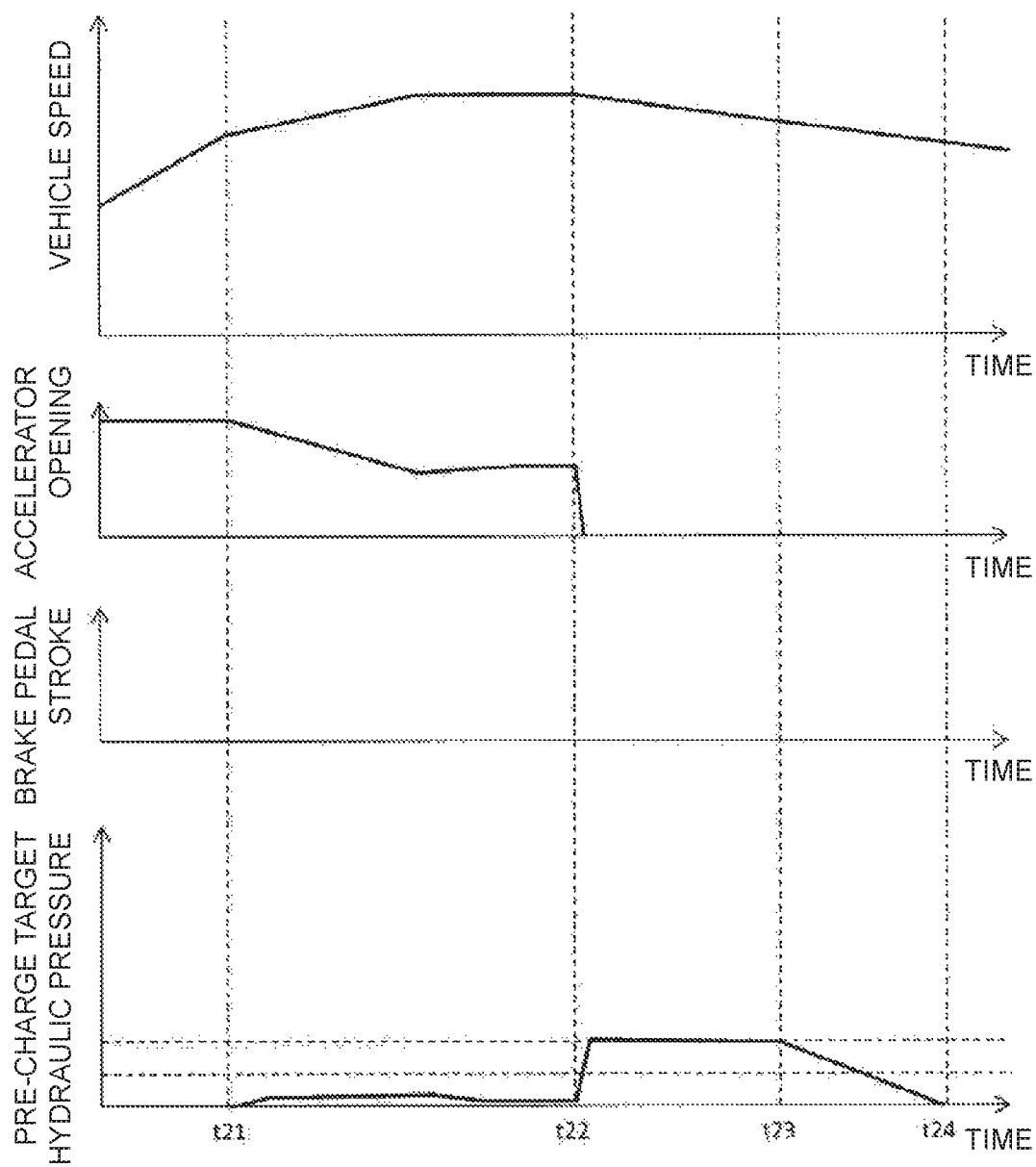
FIG. 6 is a time chart (III) describing the operation of the braking device for the vehicle according to the embodiment of the present invention.

FIG. 6 shows an operation when the driver does not shift to the brake pedal operation. A period from time t21 to time t22 is similar to a period from time t11 to time t12 of FIG. 5. In FIG. 6, the brake pedal stroke is not raised thereafter. The electronic control unit ECU gradually reduces the pre-charge target hydraulic pressure, and terminates the pre-charge control when an elapsed time (the pre-charge execution time) from time t21 at which the pre-charge control is started or time t22 at which the pre-charge target hydraulic pressure is rapidly increased has elapsed by a predetermined time without the rise of the brake pedal stroke (time t23 to t24).

Figure 7:
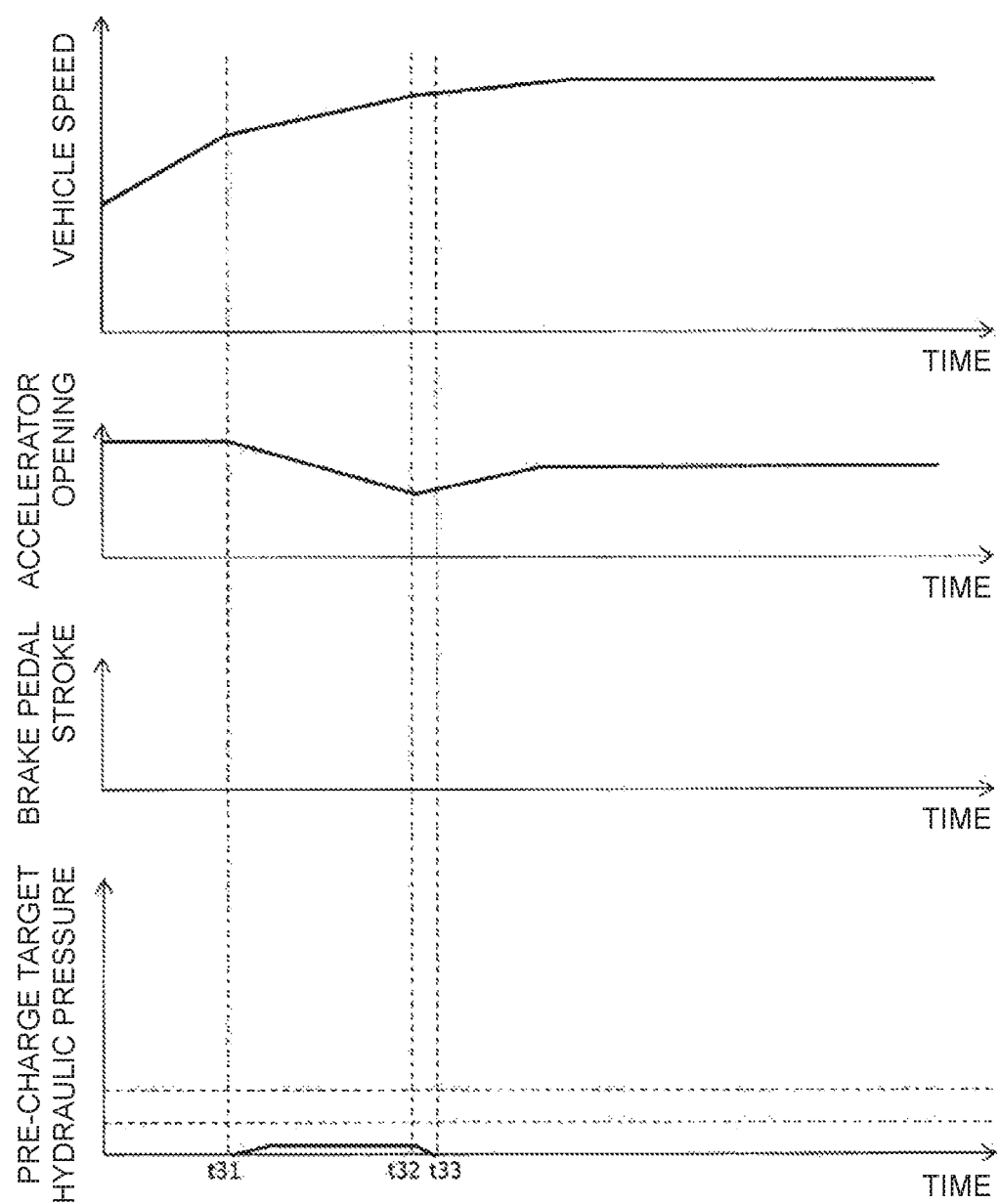
FIG. 7 is a time chart (IV) describing the operation of the braking device for the vehicle according to the embodiment of the present invention.

FIG. 7 shows an operation when the driver again increases the accelerator pedal operation amount. The pre-charge target hydraulic pressure adjusted according to the decrease gradient of the accelerator opening is set from time t31 to time t32, but the accelerator opening again starts to be increased after time t32. The electronic control unit ECU determines that there is no sign of the driver shifting from the accelerator pedal operation to the brake pedal operation, based on the increase in the accelerator opening, gradually reduces the pre-charge target hydraulic pressure, and terminates the pre-charge control (time t32 to t33).

As described above, according to the present embodiment, the brake fluid is suctioned from the reservoir RS before the driver operates the brake pedal BP in the fade state, so that the consumption of the brake fluid in the pressure chamber of the master cylinder MC can be reduced. The low pressure region of the wheel cylinder hydraulic pressure Pw in which the consumption of the brake fluid becomes larger is covered with the pre-charge by the hydraulic pressure unit HU so that the enlargement of the master cylinder can be suppressed. Furthermore, the fade state is determined based on the temperature-related value related to the pad temperature, and the brake fluid is supplied to the wheel cylinder W in advance to avoid the deceleration from actually becoming insufficient, and the pressurization responsiveness at the time of fade can be enhanced. Furthermore, the wheel cylinder hydraulic pressure Pw** of a necessary magnitude can be obtained in a necessary event by adjusting the pre-charge target hydraulic pressure according to the accelerator opening and the brake pedal stroke.

The present invention is not limited to the embodiment described above. For example, in FIG. 5, the electronic control unit ECU gradually reduces the pre-charge target hydraulic pressure when the actual hydraulic pressure becomes greater than the pre-charge target hydraulic pressure, but this is not the sole case. Since the actual hydraulic pressure also becomes greater than the pre-charge target hydraulic pressure when the driver target hydraulic pressure becomes greater than the pre-charge target hydraulic pressure, the electronic control unit ECU can start to gradually reduce the pre-charge target hydraulic pressure, based on the driver target hydraulic pressure.

Furthermore, in FIG. 6, the electronic control unit ECU gradually reduces the pre-charge target hydraulic pressure when the pre-charge execution time has elapsed a predetermined time without the rise of the brake pedal stroke, but this is not the sole case. For example, when the vehicle speed becomes a lower speed, high pressurization responsiveness is less required compared to the case of high speed. Thus, the pre-charge target hydraulic pressure may be gradually reduced based on the lowering of the vehicle speed from the predetermined speed. When the vehicle speed is further lowered, the execution of the pre-charge is immediately terminated or may not be executed.

Furthermore, the pre-charge control may be cancelled based on the increase amount of the accelerator opening other than the increase of the accelerator opening described in FIG. 7, or may be cancelled based on the magnitude of the braking force by the engine brake or the regenerative brake.

In FIG. 1, a sensor for measuring the wheel cylinder hydraulic pressure is not arranged, but one or a plurality of wheel cylinder hydraulic pressure sensors may be arranged. The hydraulic pressure can be adjusted more accurately based on the measurement value of the wheel cylinder hydraulic pressure sensor.

Furthermore, in the embodiment described above, description has been made to execute the pre-charge on all four wheels, but this is not the sole case. The pre-charge may be executed on only one of the two systems of hydraulic pressure circuits. For example, only the linear electromagnetic valve PC1 of the system related to the left and right front wheels FR, FL of the linear electromagnetic valves PC1, PC2 may be controlled according to the pre-charge target hydraulic pressure, so that the pre-charge can be executed on only the left and right front wheels FR, FL having a higher braking effect than the left and right rear wheels RR, RL have.

The pre-charge supplies the brake fluid to the wheel cylinder W** in advance before the driver operates the brake pedal BP by greater than or equal to a predetermined amount, and thus may give an uncomfortable feeling to the driver depending on the manner of deceleration. The deceleration can be appropriately suppressed by executing the pre-charge on only one system. When executing the pre-charge on the two systems of the front and rear, the lowering in the rotation number of the motor MT may occur because the load of the motor MT is larger. Contrastingly, the load of the motor MT is reduced by executing the pressurization by the pre-charge on only one system, and thus the pressure intensifying responsiveness can be enhanced.

Generally, the fluid consumption of the wheel cylinder W** of the left and right rear wheels RR, RL is smaller than that of the left and right front wheels FR, FL. Thus, the master cylinder MC is configured so that the fluid amount of the system related to the left and right rear wheels RR, RL can be compensated. The braking device for the vehicle can be configured to execute the pre-charge only on the system related to the left and right front wheels FR, FL in which the fluid consumption is greater to compensate for the deficient fluid amount. According to such configurations, the size of the master cylinder MC is merely a size (a size of bottoming for the system related to the left and right front wheels FR, FL) capable of ensuring the fluid amount of the system related to the left and right rear wheels RR, RL, and thus the size of the master cylinder MC can be reduced.

The pre-charge may be executed only on the system related to the left and right rear wheels RR, RL of the two systems of hydraulic pressure circuits for the front and rear. Generally, the deceleration of the vehicle is more difficult to generate in the brake of the left and right rear wheels RR, RL than in the left and right front wheels FR, FL. Thus, a natural brake feeling that does not give an uncomfortable feeling to the driver can be obtained by executing the pre-charge only on the system related to the left and right rear wheels RR, RL.

The invention claimed is:

1. A braking device for a vehicle comprising:
a reservoir that stores brake fluid;
a master cylinder that generates a hydraulic pressure corresponding to an operation amount of a brake pedal when the operation amount of the brake pedal becomes greater than or equal to a predetermined amount and when a port communicating a pressure chamber and the reservoir is cut off, the master cylinder being configured to output the hydraulic pressure from the pressure chamber to a wheel cylinder;
a hydraulic pressure unit arranged between the master cylinder and the wheel cylinder to adjust a hydraulic pressure of the wheel cylinder, the hydraulic pressure unit being configured to suction the brake fluid form the reservoir through the pressure chamber; and an electronic control unit that controls the hydraulic pressure unit, wherein the electronic control unit is configured to determine whether or not a friction member is in a fade state, based on a temperature-related value related to a temperature of the friction member pushed by the hydraulic pressure of the wheel cylinder against a rotating member fixed to a wheel, and when determining that the friction member is in the fade state, the electronic control unit is configured to control the hydraulic pressure unit to execute a pre-charge of suctioning the brake fluid from the reservoir through the port and the pressure chamber during a period in which the port is communicating the pressure chamber and the reservoir and of supplying the brake fluid to the wheel cylinder, wherein the electronic control unit is configured to control the hydraulic pressure unit to execute the pre-charge in a state in which the brake pedal is not operated.

2. The braking device for the vehicle according to claim 1, wherein:

the vehicle includes two systems of hydraulic pressure circuits, a front wheel system related to left and right front wheels and rear wheel system related to left and right rear wheels; and the electronic control unit is configured to control the hydraulic pressure unit to execute the pre-charge only on either one of the front wheel system and the rear wheel system of the two systems of the hydraulic pressure circuits.

3. The braking device for the vehicle according to claim 1, wherein the electronic control unit is configured to compute a pre-charge target value of the hydraulic pressure of the wheel cylinder at a time of executing the pre-charge, based on the temperature-related value.

4. The braking device for the vehicle according to claim 3, wherein the electronic control unit is configured to adjust the pre-charge target value to a larger value as a reduction speed of an accelerator pedal operation amount is greater or as an increase speed of a brake pedal operation amount is greater.

5. The braking device for the vehicle according to claim 3, wherein the electronic control unit is configured to start to gradually reduce the pre-charge target value according to an operation mode of a driver of the vehicle at a time of executing the pre-charge, and terminate executing the pre-charge when the pre-charge target value becomes zero.

6. The braking device for the vehicle according to claim 2, wherein the electronic control unit is configured to compute a pre-charge target value of the hydraulic pressure of the wheel cylinder at a time of executing the pre-charge, based on the temperature-related value.

7. The braking device for the vehicle according to claim 6, wherein the electronic control unit is configured to adjust the pre-charge target value to a larger value as a reduction speed of an accelerator pedal operation amount is greater or as an increase speed of a brake pedal operation amount is greater.

8. The braking device for the vehicle according to claim 4, wherein the electronic control unit is configured to start to gradually reduce the pre-charge target value according to an operation mode of a driver of the vehicle at a time of executing the pre-charge, and terminate executing the pre-charge when the pre-charge target value becomes zero.

9. The braking device for the vehicle according to claim 6, wherein the electronic control unit is configured to start to gradually reduce the pre-charge target value according to an operation mode of a driver of the vehicle at a time of executing the pre-charge, and terminate executing the pre-charge when the pre-charge target value becomes zero.

10. The braking device for the vehicle according to claim 7, wherein the electronic control unit is configured to start to gradually reduce the pre-charge target value according to an operation mode of a driver of the vehicle at a time of executing the pre-charge, and terminate executing the pre-charge when the pre-charge target value becomes zero.

11. A braking device for a vehicle comprising:

a reservoir that stores brake fluid;

a master cylinder having a pressure chamber therein, the master cylinder being configured to output a hydraulic pressure from the pressure chamber to a wheel cylinder;

a port configured to provide fluid communication between the reservoir and the pressure chamber, wherein the master cylinder generates the hydraulic pressure in the pressure chamber corresponding to an operation amount of a brake pedal when the operation amount of the brake pedal becomes greater than or equal to a predetermined amount and when fluid communication between the pressure chamber and the reservoir by the port is cut off;

a hydraulic pressure unit arranged between the master cylinder and the wheel cylinder to adjust a hydraulic pressure of the wheel cylinder, the hydraulic pressure unit being configured to suction the brake fluid from the reservoir through the pressure chamber; and an electronic control unit that controls the hydraulic pressure unit, wherein the electronic control unit is configured to determine whether or not a friction member is in a fade state, based on a temperature-related value related to a temperature of the friction member pushed by the hydraulic pressure of the wheel cylinder against a rotating member fixed to a wheel, and when determining that the friction member is in the fade state, the electronic control unit is configured to control the hydraulic pressure unit to execute a pre-charge of suctioning the brake fluid from the reservoir through the port and the pressure chamber during a period in which the port is communicating the pressure chamber and the reservoir and of supplying the brake fluid to the wheel cylinder, wherein the electronic control unit is configured to control the hydraulic pressure unit to execute the pre-charge in a state in which the brake pedal is not operated.

* * * * *